United States Patent [19]
Kim

[11] Patent Number: 5,317,460
[45] Date of Patent: May 31, 1994

[54] TIME DIFFERENCE SLOW MODE CONTROL CIRCUIT

[75] Inventor: Hee-Man Kim, Seoul, Rep. of Korea

[73] Assignee: SamSung Electronics Co., Ltd., Suwon, Rep. of Korea

[21] Appl. No.: 801,861

[22] Filed: Dec. 3, 1991

[30] Foreign Application Priority Data

Feb. 13, 1991 [KR] Rep. of Korea ............... 1991-2162

[51] Int. Cl.⁵ .................. G11B 15/46; G11B 21/04; H04N 5/78
[52] U.S. Cl. .................... 360/73.05; 360/70; 360/10.1
[58] Field of Search ............. 360/8–10.3, 360/27, 61, 70, 73.05, 72.06, 73.08, 19.1, 74.1, 74.4

[56] References Cited

U.S. PATENT DOCUMENTS

| | | | |
|---|---|---|---|
| 4,725,898 | 2/1988 | Tokayama | 360/10.1 |
| 4,933,774 | 6/1990 | Ishimura | 360/10.1 |
| 5,012,358 | 4/1991 | Kohsaka | 360/70 |

Primary Examiner—Aristotelis Psitos
Assistant Examiner—Varsha Sheladia
Attorney, Agent, or Firm—Robert E. Bushnell

[57] ABSTRACT

A time difference slow mode control circuit of a video tape recorder for controlling a capstan motor by picking up the reproduction control signal from a magnetic tape, in the time difference slow mode, generates delayed phase-delayed pseudo reproduction control signal by a half period of a head switching pulse, the frequency of the pseudo reproduction control signal being the same as that of the reproduction control signal, thus controlling the capstan motor so that the video tape recorder may have a normal time difference slow mode even when a pick-up error arises and thereby improving screen quality.

22 Claims, 2 Drawing Sheets

TIME DIFFERENCE SLOW MODE CONTROL CIRCUIT

BACKGROUND OF THE INVENTION

The present invention relates to a slow mode control circuit in a video tape recorder, and more particularly to a time difference slow mode control circuit for automatically compensating for reproduction control pulse pick-up error by generating a pseudo reproduction control signal.

In an operation of a tape recorder, a time difference slow mode means that a capstan motor repeats a still mode and a operating mode in turn by which displayed screens on a monitor look like a slow motion. At this time, the capstain motor should be accurately controlled when it repeats the still mode and the operating mode. Accordingly a reproduction control signal is used for an accurate control, because a microcomputer can decide a break time of the capstan motor by picking up the reproduction control signal which is recorded in a control track provided in a lower part of the tape. By reason of tape damage or something else, however, the reproduction control pulse may not be picked up, although the capstan motor is operating.

Operations of the microcomputer and a servo part now will be described with reference to FIG. 2. The servo part generates a head switching pulse with a period illustrated in FIG. 2A. Sensing a slow mode key input from a remote controller or a front panel, the microcomputer generates a step/slow signal as a first pulse mode in order to accelerate the capstan motor after a given time T1 is passed, the time T1 being measured from lowering of the head switching pulse, which is shown in FIG. 2B.

From an opening time of a screen reproduction by the capstan motor operation to a completion time of one frame of screen reproduction for a period of the head switching pulse, the step/slow signal maintains low state. At the completion of one screen reproduction, the servo part produces the reproduction control signal as shown in FIG. 2C. If the reproduction control signal is normally picked up, the microcomputer recognizes this control signal, and produces the step/slow signal of a second pulse mode when a given time T3 has passed after generation of the reproduction control signal. This makes the forwardly operating capstan motor stop, so that the time difference slow mode is achieved. The period T2 from the first pulse generating time to the second pulse generating time is the time required in order to move the tape. The break is applied to the capstan motor lest the period of the tape movement should be over the frame. Therefore, in order to drive the capstan motor in reverse direction for a given time, the microcomputer generates a capstan motor driving direction control signal as shown in FIG. 2E. As a result, the head can read the track exactly. As shown in FIG. 2D, the capstan motor driving signal supplied to the servo part from the microcomputer, keeps a first level L1 until the step/slow signal of the second pulse mode is generated from the driving of the tape, and drops to a second level L2 when the second pulse is generated. Here, the difference between the first level and the second level is needed in order to reduce the tape movement speed. That is, the tape movement speed is lowered at the second level L2, to turn over the tape movement direction.

In the case that the reproduction control pulse is not picked up by the microcomputer even when the capstan motor is operating, the microcomputer cannot provide the motor control signal to the the servo part, so that the servo part cannot exactly apply the break to the capstan motor, thus producing screen hunting or noise. In a conventional slow mode control circuit, however, a method for compensating for such a reproduction control pulse pick-up error is not provided.

SUMMARY OF THE INVENTION

Accordingly, it is an object of the present invention to provide a time difference slow mode control circuit which automatically compensates for a reproduction control pulse pick-up error by generating a pseudo reproduction control signal.

In accordance with the present invention, the time difference slow mode control circuit includes a reproduction control signal generator, and a switching part. The reproduction control signal generator has the same frequency as that of a reproduction control signal, and generates a pseudo reproduction control signal which is phase delayed by a half period of a head switching pulse. The switching part, in a time difference slow mode, not only sends the reproduction control signal to the microcomputer when the reproduction control signal is picked up in a time difference slow mode, but also sends the pseudo reproduction control signal to the microcomputer when the reproduction control signal is not picked up.

DESCRIPTION OF THE PREFERRED EMBODIMENT

One embodiment of the present invention will now be described in comparison with conventional technology and with reference to the accompanying drawings.

Figure 1:
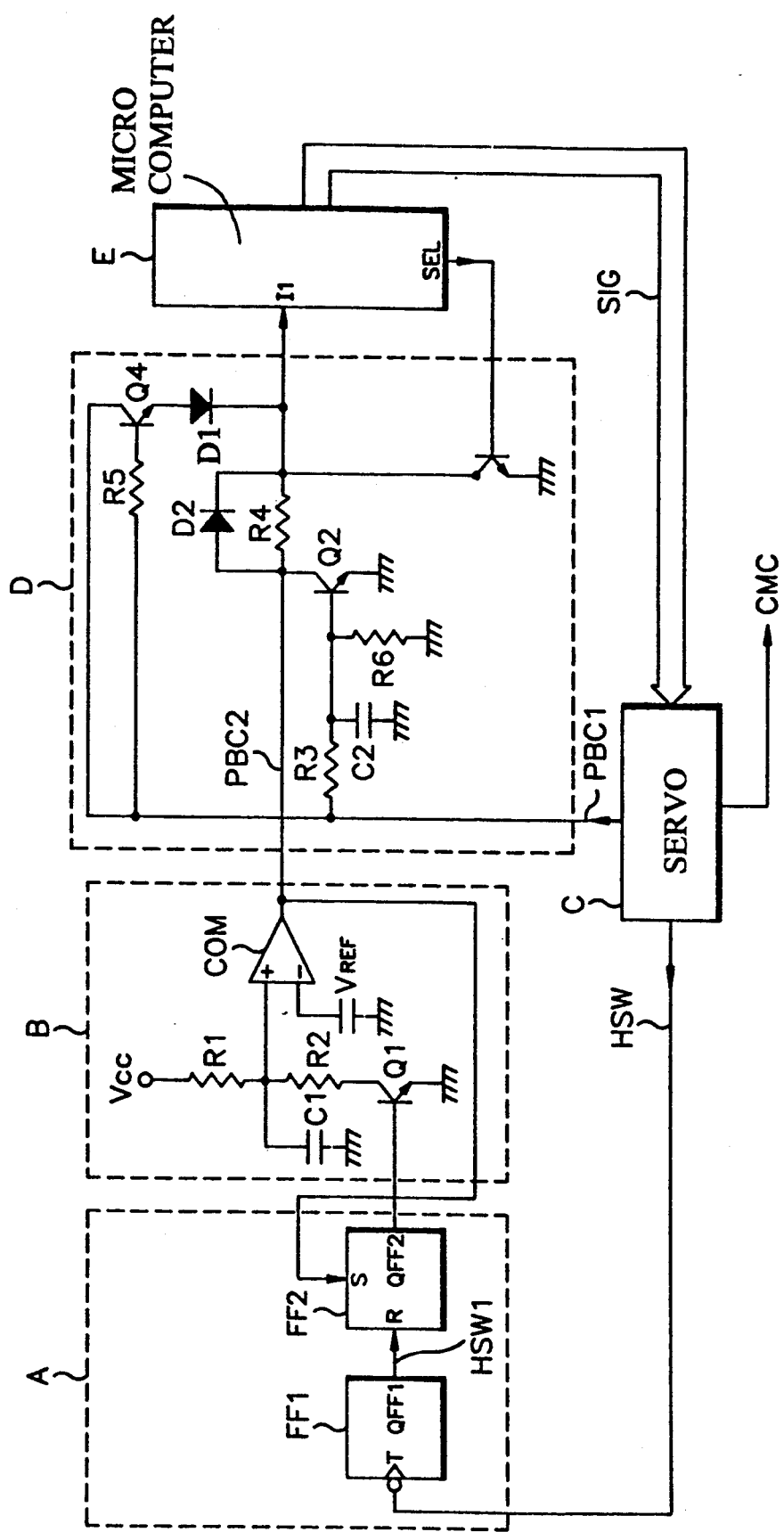
FIG. 1 is a circuit of the present invention.
Figure 2A:
FIGS. 2A to 2I are waveform diagrams showing signals to explain the overall operation of FIG. 1.
Figure 2B:
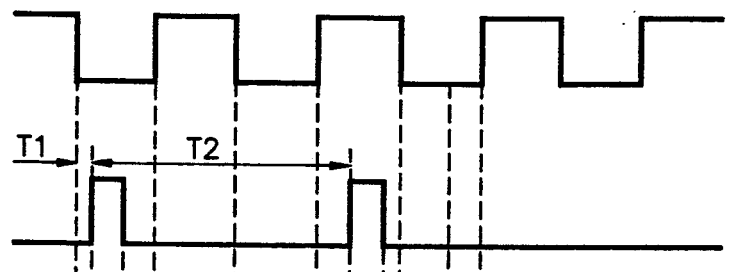
Figure 2C:
Figure 2D:
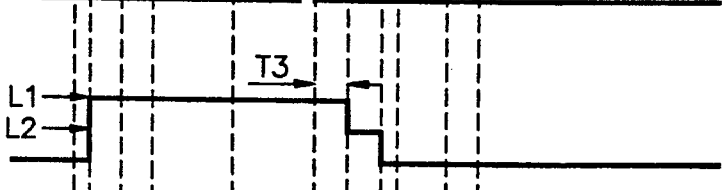
Figure 2E:
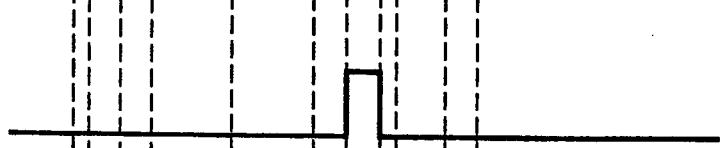
Figure 2F:
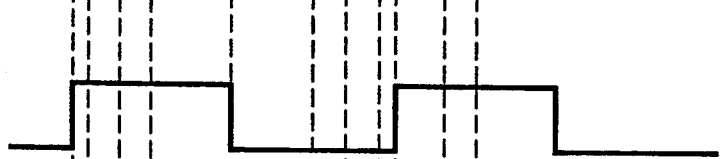

In FIG. 1, a T-type flip-flop FF1 receives a head switching pulse, HSW, shown in FIG. 2A from a servo part C, and divides the frequency of the head switching pulse HSW into two, producing the frequency-divided head switching pulse into two through a non-inverted output terminal, as shown in FIG. 2F. The frequency-divided head switching pulse into two, HSW1, is transferred to a reset terminal of a RS flip-flop FF2. The output of the RS flip-flop FF2 is applied to a base of a first transistor Q1, and turns on or off the first transistor Q1. The comparator COM compares a divided voltage divided by two resistors R1 and R2, with a reference voltage $V_{REF}$ supplied to an inverting terminal (−), the divided voltage being applied to a non-inverting terminal, and generates a pseudo reproduction control signal PBC2. A first supply voltage $V_{CC}$ is supplied to one end of the resistor R1, while the other end of the resistor R1 is connected to one end of the resistor R2, a capacitor C1, and to the non-inverting terminal of the comparator COM. The other end of the resistor R2 is connected to a collector of the transistor Q1. Therefore, the capacitor C1 is charged or discharged depending upon a operational condition of the first transistor Q1, and accordingly, the input voltage level of the non-inverting terminal is decided. The reference voltage $V_{REF}$ of the comparator COM is set up so that the output of the comparator is converted into high state from low state, in the case that the voltage charged by the capacitor C1 and the resistor R1 is higher than the reference voltage $V_{REF}$.

Figure 2G:

The operation of the comparator COM according to the input state will now be described. If the second flip-flop FF2 is reset at the leading edge of the frequency-divided head switching pulse into two, HSW1, the first transistor Q1 is turned off, so that the capacitor C1 is charged with charge of the first voltage $V_{CC}$ supplied through the resistor R1. Because the pseudo reproduction control signal PBC2 from the comparator is supplied to the set terminal of the RS flip-flop by a feedback connection, the output terminal QFF2 of the RS flip-flop goes high, and the first transistor Q1 is turned on. Thus, the charge on the condenser C1 is discharged through the first transistor Q1. That is, because according to the switching operation of the first transistor Q1, the high state output of the comparator COM due to the charging operation of the capacitor C1 is inverted to low state output at the discharging operation of the capacitor C1, the comparator COM generates the pseudo reproduction control signal PBC2 synchronized with the leading edge of the head switching pulse HSW1, frequency-divided into two, as shown in FIG. 2G.

The operation processes supplying the reproduction control signal or pseudo reproduction control signal will be described concretely, assuming that the above-described pseudo reproduction control signal is generated.

The servo part C amplifies the reproduction control signal PBC1 received from an audio/control head (not figured), the a reproducing mode control signal being picked up during reproduction. The servo part C sends the amplified reproduction control signal to the microcomputer E. Also the servo part C receives given control signals SIG in slow mode, to thereby control the capstan motor. Here, the control signals SIG related to the time difference slow mode represent the prede-scribed step/slow signal, capstan motor control signal, and capstan motor driving direction control signal.

Firstly, in case of normal reproduction of the tape, the microcomputer E produces a high state signal through a mode selection terminal SEL. The transistor Q3 whose base is connected to the mode selection terminal SEL, is turned on. The collector of the transistor Q3 is commonly connected to first and second diodes D1 and D2, and resistor R4; and the reproduction control signal PBC1 and the pseudo reproduction control signal PBC2 are supplied to the collector of the transistor Q3 through the first and second the first diodes D1 and D2, respectively. Accordingly, when the transistor Q3 is turned on, not only is the pseudo reproduction control signal PBC2 bypassed through the collector and the emitter of the transistor Q3, and is not transferred to the microcomputer E, but also the second transistor Q2 keeps the pseudo reproduction control signal from being transferred to the microcomputer E, being in turn-on state when the reproduction control signal PBC1 is picked up by the audio/control head and supplied to the base of the transistor Q2, the transistor Q2 being turned on or off in dependence upon the state of the reproduction control signal PBC1 supplied to the base of the transistor Q2, through a resistor R3, and a capacitor C2 and a resistor R6 which are in parallel with the resistor R3.

Therefore, the reproduction control signal PBC1 picked up from a magnetic tape reproducing head is supplied to a collector and a base of a fourth transistor Q4 through the resistor R5, turning on the fourth transistor Q4. Thus the reproduction control signal PBC1 is bypassed through the collector and emitter Q3, and not transferred to the microcomputer E.

Next, the time difference slow mode will be described. In the time difference slow mode, the signal from the mode selection terminal SEL of the microcomputer E is low state, so that the transistor Q3 is turned off.

If the reproduction control signal PBC1 is normally picked up, the transistors Q2, Q4 are turned on because the voltage level on the bases of the transistors Q2, Q4 is high state. As a result, the reproduction control signal PBC1 is transferred to the reproduction control signal input terminal I1 of the microcomputer E through the transistor Q4 and the diode D1. At this time, the pseudo reproduction control signal PBC2 is not transferred to the reproduction control signal input terminal I1 of the microcomputer because the pseudo reproduction control signal PBC2 is bypassed through the collector and emitter of the second transistor Q2.

Figure 2H:
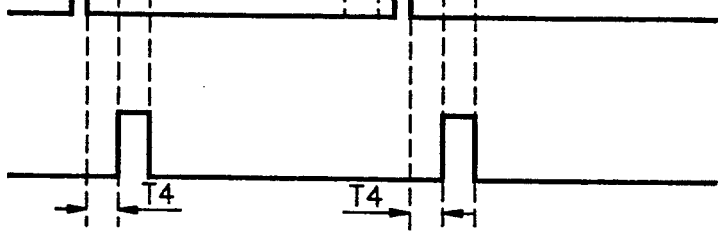
Figure 2I:

On the other hand, if the reproduction control signal is not picked up even when the tape is moving, the transistors Q2 and Q4 are turned off, because the voltage level on the bases of the transistors Q2 and Q4 are both low state. Thus, the pseudo reproduction control signal PBC2 from the comparator COM is applied to the reproduction control signal input terminal I1 through the diode D2 and resistor R4. In the case that the reproduction control signal PBC1 is not picked up, the microcomputer E generates the step/slow signal and the capstan motor driving direction control signal, in response to receipt of the pseudo reproduction control signal, as shown in FIGS. 2H and FIG. 2I, thereby setting the break time of the capstan motor. That is, in the case that the reproduction control signal PBC1 shown in FIG. 2C is not picked up, the microcomputer E receives the second pulse of the pseudo reproduction control signal PBC2 shown in FIG. 2G, generating the second pulse of the step/slow signal shown in FIG. 2H and the capstan motor driving direction control signal shown in FIG. 2I, after a time T4 has elasped from the time a falling edge PBC2 was received by the microcomputer so that the capstan motor can reverse its direction.

As described above, according to the present invention, screen hunting and noise can be prevented, since the pick-up error is automatically compensated for by means of the pseudo reproduction control signal generated from the comparator when the pick-up error arises.

While the present invention has been particularly shown and described with reference to the preferred embodiment thereof, it will be understood by those skilled in the art that foregoing and other changes in form and details may be made without departing from the spirit and scope of the present invention.

What is claimed is:

1. A time difference slow mode control circuit of a video tape recorder having a normal mode of reproduction and a time difference slow mode wherein a capstan motor alternately stops and rotates to make video images appear to move in slow motion, said video tape recorder having servo means for generating a head switching pulse and for amplifying a reproduction control signal picked up by an audio/control head of the video tape recorder, said servo means controlling the capstan motor in response to time difference slow mode control signals, and a microcomputer generating said time difference slow mode control signals in response to said reproduction control signal, to control said servo means, said time difference slow mode control circuit comprising:
- pseudo reproduction control signal generating means for generating a pseudo reproduction control signal in response to said head switching pulse; and
- switching means for enabling transmission of said reproduction control signal to said microcomputer when said reproduction control signal is picked up, and for enabling transmission of said pseudo reproduction control signal to said microcomputer to enable generation of said time difference slow mode control signals when said reproduction control signal is not picked up, during said time difference slow mode.

2. The time difference slow mode control circuit according to claim 1, wherein said pseudo reproduction control signal generating means comprises:
- frequency dividing means receiving said head switching pulse, for providing a frequency divided head switching pulse by dividing the frequency of said head switching pulse; and
- pulse generating means for generating a trigger pulse synchronized with a leading edge of said frequency divided head switching pulse.

3. The time difference slow mode circuit according to claim 2, wherein said pulse generating means comprises:
- first control means for generating a first control signal having a first level at said leading edge of said frequency divided head switching pulse, said first level being varied to a second level by said pseudo reproduction control signal;
- voltage generating means for charging and discharging a given supply voltage, to generate a divided voltage;
- second control means for controlling charging and discharging of said voltage generating means, in dependence upon said first control signal; and
- comparator means for comparing an output signal of said voltage generating means with a reference voltage, to generate said pseudo reproduction control signal, and for feeding back said pseudo reproduction control signal into said first control means.

4. The time difference slow mode circuit as claimed in claim 2, wherein said pulse generating means comprises:
- first control means for generating a first control signal in response to said frequency divided head switching pulse and said pseudo reproduction control signal;
- voltage generating means for generating a first voltage;
- second control means for charging and discharging said first voltage created by said voltage generating means in response to said first control signal; and
- comparator means for generating said pseudo response reproduction control signal by comparing said first voltage with said reference voltage.

5. The time difference slow mode circuit as claimed in claim 4, wherein:
- said first control means comprises a flip-flop coupled to said second control means, and said comparator means;
- said voltage generating means comprises:
  - a first resistor coupled between a voltage source and a node;
  - a capacitor coupled between said node and a reference potential; and
  - a second resistor coupled between said node and said second control means; and
- said second control means comprises a control transistor having a collector connected to said second resistor and having a base connected to said flip-flop.

6. The time difference slow mode control circuit as claimed in claim 4, wherein said switching means comprises:
- a plurality of resistors;
- a plurality of diodes; and
- wherein, said switching transistors cuttoff said reproduction control signal from said microcomputer during said normal reproduction mode and supply said microcomputer with said reproduction control signal when said reproduction control signal is picked up during said time difference slow mode.

7. The time difference slow mode control circuit according to claim 1, wherein said switching means comprises:
- first delivery means for delivering said reproduction control signal to said microcomputer;
- second delivery means for delivering said pseudo reproduction control signal to said microcomputer;
- supplying cut-off means for cutting off said pseudo reproduction control signal being supplied to said microcomputer during said time difference slow mode when said reproduction control signal is picked up, and in said normal mode.

8. The time difference slow mode control circuit as claimed in claim 7, wherein said supplying cut-off means comprises:
- a plurality of resistors;
- a plurality of diodes; and
- a plurality of switching transistors; and
- wherein, said switching transistors interrupting transmission of said reproduction control signal from said microcomputer during said normal reproduction mode and interrupting transmission of said reproduction control signal to said microcomputer when said reproduction control signal is picked up during said time difference slow mode.

9. The time difference slow mode control circuit as claimed in claim 7, wherein said supplying cut-off means comprises at least one switch, said switches being turned on and off, respectively, in response to a presence and an absence of said reproduction control signal.

10. The time difference slow mode control circuit as claimed in claim 1, wherein said pseudo reproduction control signal generating means generates said pseudo reproduction control signal having substantially the same frequency as said reproduction control signal.

11. The time difference slow mode control circuit as claimed in 10, wherein said pseudo reproduction control signal is phase delayed by one-half of a period of said head switching pulse.

12. A method for providing a microcomputer of a video tape recorder with a pseudo reproduction control signal during a time difference slow mode wherein a capstan motor alternately stops and rotates in order to make video images appear to move in slow motion, in order to compensate for reproduction control signal error, said method comprising the steps of:
- generating a pseudo reproduction control signal in response to a head switching pulse amplified by a servo of the video tape recorder;

delivering said pseudo reproduction control signal to said microcomputer, during said time difference slow mode when a reproduction control signal is not picked up by an audio/control head;

delivering said reproduction control signal to said microprocessor, during said time difference slow mode when said reproduction control signal is picked up by said audio/control head;

generating time difference slow mode control signals in response to said reproduction control signal and said pseudo reproduction control signal; and driving the capstan motor in response to said time difference slow mode control signals.

13. The method as claimed in claim 12, wherein said step of generating a pseudo reproduction control signal further comprises the steps of:

dividing the frequency of the said head switching pulse; and providing a pseudo reproduction control signal in response to said head switching pulse.

14. The method as claimed in claim 13, wherein said step of providing a pseudo reproduction control signal further comprises the steps of:

generating a controlling signal in response to said divided frequency head switching pulse;

charging and discharging a voltage at a node in response to said controlling signal; and making a comparison between said voltage at said node and a reference voltage, to generate said pseudo reproduction control signal.

15. The method as claimed in claim 12, wherein said step of delivering said pseudo reproduction control signal to said microcomputer further comprises the step of altering a condition of at least one switch to a first state if said reproduction control signal is not picked up by said audio/control head.

16. The method as claimed in claim 15, wherein said step of delivering said reproduction control signal to said microcomputer further comprises the step of altering a condition of at least one switch to a second state if said reproduction control signal is picked up by the audio/control head.

17. A control circuit for controlling a capstan motor of a video tape recorder during a time difference slow mode wherein the capstan motor alternately stops and rotates in order to make video images appear to move in slow motion, said control circuit comprising:

servo means for generating a head switching pulse, for amplifying a reproduction control signal received from an audio/control head, and for driving the capstan motor in response to time difference slow mode control signals;

pseudo reproduction control signal generating means for generating a pseudo reproduction control signal in response to said head switching pulse;

switch means for alternately enabling transmission of one of said reproduction control signal and said pseudo reproduction control signal during said time difference slow mode in dependence upon receipt of said reproduction control signal by said switch means, to generate a capstan control signal; and microprocessing means for generating said time difference slow mode control signals in response to said capstan control signal.

18. The control circuit as claimed in claim 17, wherein said pseudo reproduction control signal comprises:

frequency dividing means for dividing a frequency of said head switching pulse, to generate a frequency divided head switching pulse;

first control means for generating a first control signal in response to said frequency divided head switching pulse and said pseudo reproduction control signal;

means for generating a first predetermined voltage, and for discharging said predetermined voltage to generate a second predetermined voltage, in response to said first control signal; and comparator means for comparing said first predetermined voltage and said second predetermined voltage to a reference voltage, to generate said pseudo reproduction control signal.

19. The control circuit as claimed in claim 18, wherein said frequency dividing means divides the frequency of said head switching pulse by two.

20. The control circuit as claimed in claim 19, wherein said pseudo reproduction control signal has substantially the same frequency as said reproduction control signal.

21. The control circuit as claimed in claim 18, wherein said switch means cuts off said reproduction control signal and said pseudo reproduction control signal from said microprocessing means in response to a mode selection signal generated by said microprocessing means during a normal mode of reproduction.

22. The control circuit as claimed in claim 17, wherein said switch means cuts off said reproduction control signal and said pseudo reproduction control signal from said microprocessing means in response to a mode selection signal generated by said microprocessing means during a normal mode of reproduction.

* * * * *